(12) United States Patent
Bifulco et al.

(10) Patent No.: US 10,389,623 B2
(45) Date of Patent: Aug. 20, 2019

(54) PACKET DATA NETWORK, A METHOD FOR OPERATING A PACKET DATA NETWORK AND A FLOW-BASED PROGRAMMABLE NETWORK DEVICE

(71) Applicant: NEC EUROPE LTD., Heidelberg (DE)

(72) Inventors: Roberto Bifulco, Heidelberg (DE); Thomas Dietz, Weingarten (DE); Stavros Konstantaras, Amsterdam (NL)

(73) Assignee: NEC CORPORATION, Tokyo (JP)

( * ) Notice: Subject to any disclaimer, the term of this patent is extended or adjusted under 35 U.S.C. 154(b) by 213 days.

(21) Appl. No.: 14/772,790

(22) PCT Filed: Mar. 12, 2013

(86) PCT No.: PCT/EP2013/055033
§ 371 (c)(1),
(2) Date: Sep. 4, 2015

(87) PCT Pub. No.: WO2014/139558
PCT Pub. Date: Sep. 18, 2014

(65) Prior Publication Data
US 2016/0020998 A1 Jan. 21, 2016

(51) Int. Cl.
*H04L 12/721* (2013.01)
*H04L 12/715* (2013.01)
(Continued)

(52) U.S. Cl.
CPC .............. *H04L 45/38* (2013.01); *H04L 45/60* (2013.01); *H04L 45/64* (2013.01); *H04L 47/122* (2013.01); *H04L 47/31* (2013.01)

(58) Field of Classification Search
None
See application file for complete search history.

(56) References Cited

U.S. PATENT DOCUMENTS

2009/0327514 A1 12/2009 Foschiano et al.
2011/0320632 A1 12/2011 Karino
(Continued)

FOREIGN PATENT DOCUMENTS

CN 102884768 A 1/2013
EP 2582100 A1 4/2013

OTHER PUBLICATIONS

"OpenFlow Switch Specification version 1.2". Dec. 5, 2011 (Dec. 5, 2011), XP055073743, Retrieved from the Internet: URL: https://www.opennetworking.org/images/stories/downloads/sdn-resource/onl-specifications/openflow/openflow-spec-v1.2.pdf, see sections 4.4, 4.5 and 5.1.

*Primary Examiner* — Mohammad S Adhami
(74) *Attorney, Agent, or Firm* — Leydig, Voit & Mayer, Ltd.

(57) ABSTRACT

A packet data network includes a flow-based programmable network device. The flow-based programmable network device includes a data plane having a plurality of input and output ports, a control interface and forwarding rules that map packets received on one of the input ports to one of the output ports based on a packet matching a rule in the forwarding rules. A controller entity is configured to program the flow-based programmable network device via the control interface. The flow-based programmable network device has a connection via the data plane to at least one delegated entity which is a network device configured to process network traffic on behalf of the flow-based programmable network device in a transparent manner from a perspective of the controller entity.

19 Claims, 9 Drawing Sheets

(51) Int. Cl.
*H04L 12/773* (2013.01)
*H04L 12/803* (2013.01)
*H04L 12/833* (2013.01)

(56) References Cited

U.S. PATENT DOCUMENTS

| | | |
|---|---|---|
| 2012/0250686 A1 | 10/2012 | Vincent et al. |
| 2013/0058208 A1* | 3/2013 | Pfaff .................. H04L 12/4633 370/217 |
| 2013/0088967 A1 | 4/2013 | Kusumoto |
| 2013/0103817 A1* | 4/2013 | Koponen ............ G06F 9/45558 709/223 |
| 2013/0230047 A1* | 9/2013 | Subrahmaniam ... H04L 47/2441 370/392 |
| 2013/0272135 A1 | 10/2013 | Leong |

* cited by examiner

PACKET DATA NETWORK, A METHOD FOR OPERATING A PACKET DATA NETWORK AND A FLOW-BASED PROGRAMMABLE NETWORK DEVICE

CROSS-REFERENCE TO PRIOR APPLICATIONS

This application is a U.S. National Phase application under 35 U.S.C. § 371 of International Application No. PCT/EP2013/055033, filed on Mar. 12, 2013. The International Application was published in English on Sep. 18, 2014 as WO 2014/139558 under PCT Article 21(2).

FIELD

The present invention relates to packet data network and a method for operating such packet data network, comprising a flow-based programmable network device and a controller entity, wherein said flow-based programmable network device includes a data plane having input/output ports, and forwarding rules that map packets received on an input port to an output port based on a packet matching a rule in the forwarding rules, and a control interface, and wherein said controller entity is configured to program said flow-based programmable network device via said flow-based programmable network device's control interface.

Furthermore, the present invention relates to a flow-based programmable network device, in particular a switch or a router, preferably being configured to use the OpenFlow protocol, comprising a data plane having input/output ports, and forwarding rules that map packets received on an input port to an output port based on a packet matching a rule in the forwarding rules, and a control interface being configured to receive configuration settings from a controller entity for programming the flow-based programmable network device.

BACKGROUND

In recent years flow-based programmable network devices have gained increasing attraction, in particular in connection with software-defined networking (SDN). The development from traditional network architectures to SDN architectures has been triggered and pushed forward by a need for new structures resulting from the explosion of mobile communication and emerging computing trends, like cloud computing, server virtualization, or "Big data" processing. These computing trends come along with a gradual replacement of traditional client-server applications with applications that require access to various databases and servers with significantly different traffic patterns that create a vast amount of machine-to-machine traffic.

In order to overcome the limitations of current network technologies and to meet the requirements resulting from the growing dynamics of today's network usage, SDN decouples control and data planes. In SDN, the traditional binding of network control to individual network devices is abolished. Instead, network control is migrated to separated software-based SDN controllers, which maintain a global view of the network. As a result, SDN enables programmable central control of network traffic without requiring physical access to the network's hardware devices. OpenFlow is the first standard protocol for controlling flow-based programmable network devices, in particular SDN devices, by providing an interface that allows communication between the control plane and the data plane.

Flow-based programmable network devices, like e.g. SDN switches, have a control interface that is used by the controller to configure/program them. The control interface is a critical element of a flow-based programmable network device to enable advanced network functions, since it deals directly with the ability of the controller to timely provide the flow-based programmable network device with the required instructions. Even if the control interface performance actually depends on the specific implementation of the flow-based programmable network device, in many cases the control interface is identified as the bottleneck in the performance of these devices. As a consequence, scalability of the switches' control interface is an important issue.

SUMMARY

In an embodiment, the present invention provides a packet data network including a flow-based programmable network device. The flow-based programmable network device includes a data plane having a plurality of input and output ports, a control interface and forwarding rules that map packets received on one of the input ports to one of the output ports based on a packet matching a rule in the forwarding rules. A controller entity is configured to program the flow-based programmable network device via the control interface. The flow-based programmable network device has a connection via the data plane to at least one delegated entity which is a network device configured to process network traffic on behalf of the flow-based programmable network device in a transparent manner from a perspective of the controller entity.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention improves and further develops a packet data network, a method for operating a packet data network and a flow-based programmable network device of the initially described types in such a way that the capabilities of the flow-based programmable network device are enhanced, e.g. in terms of enabling more complex applications, and that the performance characteristics of the network, e.g. in terms of load balancing, is improved.

According to an embodiment of the invention, a packet data network is characterized in that said flow-based programmable network device has a connection via its data plane to at least one other network device—delegated entity—, which is configured to process network traffic on behalf of said flow-based programmable network device in a transparent manner from the perspective of said controller entity.

According to a further embodiment of the invention, the method is characterized in the steps of
establishing a connection of said flow-based programmable network device via its data plane to at least one other network device—delegated entity—,
wherein said at least one delegated entity processes network traffic on behalf of said flow-based programmable network device in a transparent manner from the perspective of said controller entity.

According to a still further embodiment of the invention, a flow-based programmable network device is characterized in that the flow-based programmable network device is configured, upon receiving offloading decisions from said controller entity, to offload network traffic from its control interface by directing/receiving network traffic through its data plane to/from at least one other network device—delegated entity—.

According to an embodiment of the invention, it has been recognized that the capabilities and performance metrics of a flow-based programmable network device can be significantly enhanced by performing a kind of "outsourcing" to one or more delegated entities, which perform certain tasks on behalf of the flow-based programmable network device, seamlessly for the controller entity. In accordance with the invention, the delegated entities thus function as transparent proxies between the flow-based programmable network device and the controller entity. By applying the present invention, for instance in an SDN architecture, higher communication rates between SDN devices and SDN controllers are supported. Further, the invention provides the ability to enhance the functional capabilities of a SDN device enabling the use of more complex control applications, e.g., highly-reactive applications. At the same time, it provides also a mean to seamlessly extend the capabilities of SDN devices introducing dynamic trade-offs between data-plane performance and control-plane performance.

According to a preferred embodiment of the invention, the network may comprise a filter component which is in charge of deciding which flow-based programmable network devices and which particular network traffic shall not be handled by the respective flow-based programmable network device itself, but instead by a delegated entity. The filter component may be implemented as a logical entity that is located either at the controller entity or at the delegated entity. It is noted that a localization at the controller entity is envisioned in particular for those cases in which a localization at the delegated entity is not possible due to technical reasons, e.g. in case the delegated entity is a switch deployed in the network.

The filter component may be configured to transmit to the flow-based programmable network device offloading decisions that instruct the flow-based programmable network device to offload certain network flows to a delegated entity. The decisions can be taken according to a custom strategy. A strategy preferred in terms of simplicity consists in making static offloading decisions. Knowing the traffic patterns in the controlled network, it is possible to setup in advance some flow-based programmable network devices to be offloaded. The decision can be taken combining the information of well-known performance metrics of the involved devices with the information about expected traffic flows. An alternative strategy preferred in terms of effectiveness and flexibility consists in making dynamic offloading decisions: The controller entity could react applying offloading to a flow-based programmable network device when the amount of control traffic exchanged with that device increases up to a certain threshold. The threshold can be decided according to the device's known limitations (e.g., obtained from a switch data-sheet), or using other methods, such as polling the device for resources utilization.

According to a preferred embodiment of the invention, the delegated entity is configured to perform control interface processing on network traffic on behalf of the flow-based programmable network device. For instance, some of the network traffic typically handled at the flow-based programmable network device may be directed to the delegated entity directly to the data path of the flow-based programmable network device; hence, the device's control interface is not involved at all in the handling of such network traffic. In order to perform such offloading of network traffic effectively, appropriate rules may be installed into the forwarding table of the flow-based programmable network device.

Generally, offloading of network traffic from the control interface of a flow-based programmable network device may relate to (selectively) offloading at least one of In-events, Out-events, or Mod-Events. In the context of the present invention, the term "In-Event" refers to events generated upon the reception of a network packet at the data plane of a flow-based programmable network device that has to be notified to the controller entity. The term "Out-Event" refers to events generated by the controller entity including messages sent from the controller entity to the flow-based programmable network device to ask the forwarding of a network packet. Finally, the term "Mod-Event" refers to events in which the controller entity wishes to modify the forwarding table of a flow-based programmable network device and in which the respective messages are sent from the controller entity to the flow-based programmable network device.

In order to allow the filter component to transform offloaded events seamlessly for the controller entity, a tagging mechanism may be provided for marking network packets that belong to network traffic offloaded from a flow-based programmable network device. In other words, the tagging mechanism is used to tunnel network packets towards the delegated entity in a way that enables the delegated entity handle them in a proper way. Moreover, the tagging approach may be used to delegate the control of the specific data-plane network ports of the flow-based programmable network device to the delegated entities.

According to a further preferred embodiment of the invention, the filter component may be configured to generate conversion rules for transforming messages related to offloaded events in such a way that the messages, from the perspective of the controller entity, are indistinguishable from respective messages that are generated by and/or directed to the flow-based programmable network device directly.

The flow-based programmable network device may be connected to the delegated entity directly or through a network path. In the latter case, a network tunnel may be established between the flow-based programmable network device and the delegated entity.

Notably, embodiments of the invention work in the context of flow-based programmable switches, which form a "software defined network". In contrast to conventional networks, software defined networks (SDN's), such as OpenFlow, along with virtualization technologies on switches, offer immense flexibility both in terms of defining and monitoring the network state. For example, within the OpenFlow paradigm, the network is completely controlled by a controller entity that communicates with network elements that also understand the OpenFlow protocol. The network traffic is controlled by a set of programmable traffic forwarding rules, which map incoming packets on a switch port to the outgoing switch port within an instance of a switch (either physical or virtual). Thus, the OpenFlow protocol has built-in functionality for forwarding traffic. While some embodiments of the invention are described using OpenFlow switches as examples of flow-based programmable switches, it will be understood that the methods of the invention may be used with any flow-based programmable switch.

According to an embodiment of the invention, the delegated entity is an SDN switch already deployed in the network. In such case it may be provided that peer-to-peer protocols or extensions to existing SDN protocols are used for deciding and coordinating offloading processes between two or more SDN switches. According to an alternative embodiment the delegated entity is a dedicated ("offloading") entity, which is specifically deployed within the network for the purpose of providing offloading functionality to an overloaded flow-based programmable network device or for the purpose of providing any other functionality or capability a flow-based programmable network device is missing in the data plane. The delegated entity may be a physical device or a virtual device, which is realized e.g. as a software module inside another device.

The embodiments of the present invention described hereinafter in some more detail in connection with FIGS. 1-12 are mostly related to the SDN (Software-defined Networking) approach. Consequently, the terminology employed hereinafter is adapted to the SDN terminology. However, as will be appreciated by those skilled in the art, the application of the present invention is not limited to SDN devices and networks. In fact, it is possible to apply the invention in connection with any kind of flow-based programmable devices that operate according to a technology other than the SDN technology.

Figure 1:
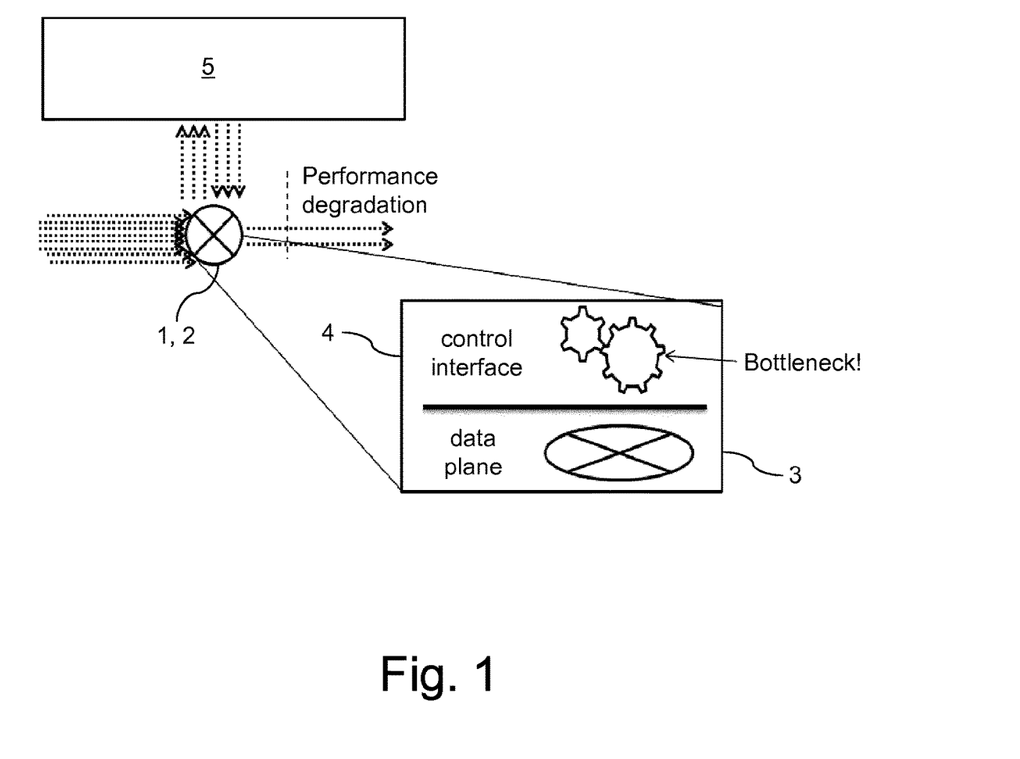
FIG. 1 is a schematic view of an SDN switch illustrating related control interface scalability issues.

FIG. 1 schematically illustrates a flow-based programmable network device 1 in form of an SDN switch 2 implemented in a network. As shown in the enlarged view in the lower right part of FIG. 1, the SDN switch 2 includes a data plane 3 and a control interface 4. Although not shown in FIG. 1 for the purpose of simplicity, the data plane 3 includes input/output ports, and forwarding rules that map packets received on an input port to an output port based on the packet matching a rule in the forwarding rules.

In accordance with the SDN approach, which separates and abstracts "control plane" elements from "data plane" elements, the SDN switch 2 of FIG. 1 implements only the data plane 3 of the network, while the control plane is realized at a separated controller entity 5, which configures and programs the SDN switch 2 via its control interface 4. Therefore, the control interface 4 is a critical element of the SDN switch 2 to enable advanced network functions, since it deals directly with the ability of the controller entity 5 to timely provide the switch 2 with the required instructions. Even if the control interface performance actually depends on the switch implementation, in many cases the control interface 4 is identified as the bottleneck in the switch's performance, which may cause (significant) performance degradation.

Figure 2:
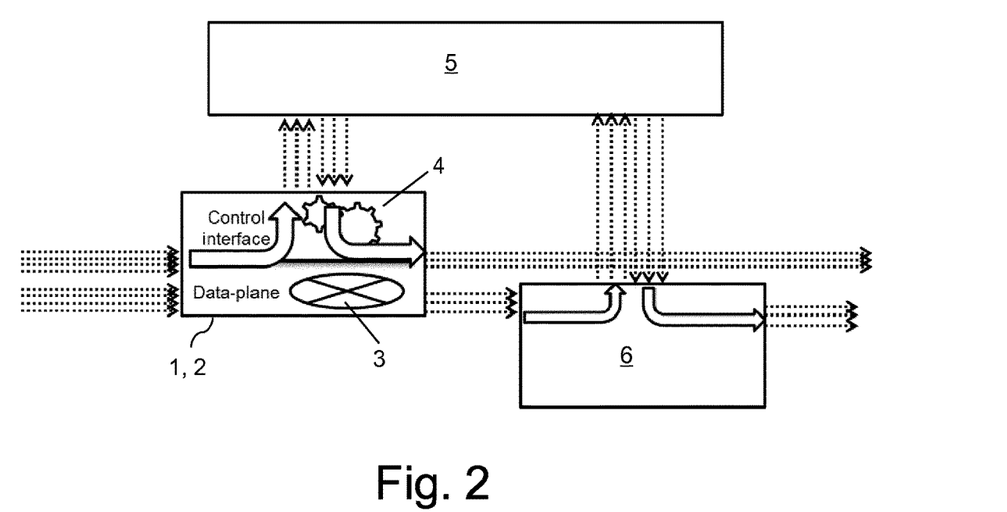
FIG. 2 is a schematic view illustrating the basic concept of offloading parts of an SDN switch's control interface load to a delegated entity according to an embodiment of the present invention.

FIG. 2 schematically illustrates the basic concept of offloading parts of an SDN switch's 2 control interface load to a delegated entity 6 according to an embodiment of the present invention. As shown in FIG. 2, network flows, which are illustrated by the dotted line arrows, arriving at the SDN switch 2 are processed according to the current switch state. More specifically, the network traffic is controlled by a set of programmable traffic forwarding rules, which map incoming packets on a switch port to the outgoing switch port within an instance of the SDN switch 2 (either physical or virtual). It will be understood that as used herein, a "flow" may refer to the stream of packets that share common properties (e.g. having the same source and/or destination) and that are thus forwarded by a single rule in the set of programmable traffic forwarding rules. Thus, "flow" and "rule" are sometimes used to refer to the same granularity of forwarding of packets.

Depending on the configuration of the switch state, packets belonging to network flows that cannot be processed at the data plane 3 due to the lack of matching forwarding rules are normally either discarded/dropped or handed over via the switch's 2 control interface 4 to the controller entity 5. In order to address the above mentioned scalability issues of the switches' control interface 4, embodiments of the present invention provide the ability to offload the control interface 4 load of a switch 2, sometimes denoted 'delegator' hereinafter, to a separated delegated entity 6, which is connected, directly or indirectly, to the delegator's 2 data-plane 3. As shown in FIG. 2, some of the network traffic handled at the delegator 2 is directed to the delegated entity 6 directly through the data-plane 3 of the delegator, such that the delegator's 2 control interface 4 is not involved at all in the handling of such network flows. Insofar, from the perspective of the delegator 2, the delegated entity 6 can be regarded as an offloading box.

There are various possibilities, on the part of the controller entity 6, to make decisions on i) which switches inside a network are to be selected to benefit from the offloading opportunities and ii) which particular subset of traffic is to be offloaded from selected switches. Regarding i) it is envisioned to apply offloading to those switches whose control interface is overloaded, wherein the controller entity 6 is in charge of deciding which switches need to be offloaded and when to do it. Basically, the decision can be taken according to a static approach based on known traffic patterns and performance metrics of the involved switches or according to a dynamic approach based on the actual workload of switches, which is continuously or regularly being monitored. Decision ii) can be taken by implementing well-defined rules at the data plane of a switch specifying that, e.g., all network flows arriving at particular input ports of the switch or all network flows originating from a particular network domain are offloaded to delegated entities.

Generally, three main tasks can be identified that are executed by an SDN switch's 2 control interface 4:

1. Handling of "In-Events":

The term "In-Event" denotes events that are generated upon the reception of a network packet at an input port of the SDN switch 2 that has to be notified to the controller entity 6, e.g. due to the lack of matching forwarding rules as mentioned above. Insofar, In-Events are related to single network packets.

2. Handling of "Out-Events":

The term "Out-Event" denotes events according to which a message is sent from the controller entity 6 to the switch 2 to ask the forwarding of a network packet. As such, Out-Events are also related to single network packets.

3. Handling of "Mod-Events":

The term "Mod-Event" denotes events according to which a message is sent from the controller entity 6 to the switch 2 to perform a modification of its forwarding table. Insofar, Mod-Events are related to the switch's 2 configuration state.

Figure 3A:
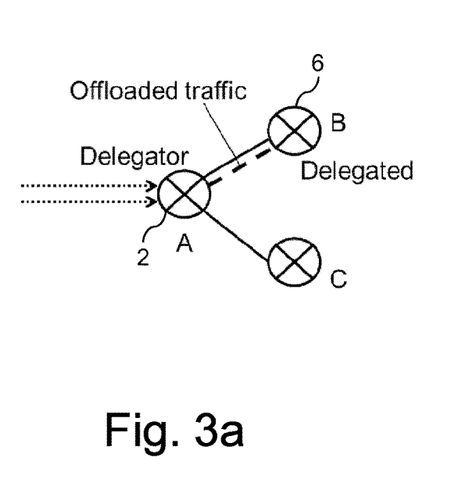
FIGS. 3a and 3b are schematic views illustrating different implementations of delegated entities in accordance with embodiments of the present invention.

Embodiments of the present invention are related to methods to distribute In-Events, Out-Events or Mod-Events among several switches, in order to distribute the related load among them. A respective example is schematically illustrated in FIG. 3a, where a switch 2, delegator A, has a physical connection (indicated by solid lines) to two other switches B and C being deployed in the network. Switch B is employed as delegated entity 6, to which delegator A offloads a certain part of its traffic.

Figure 3B:
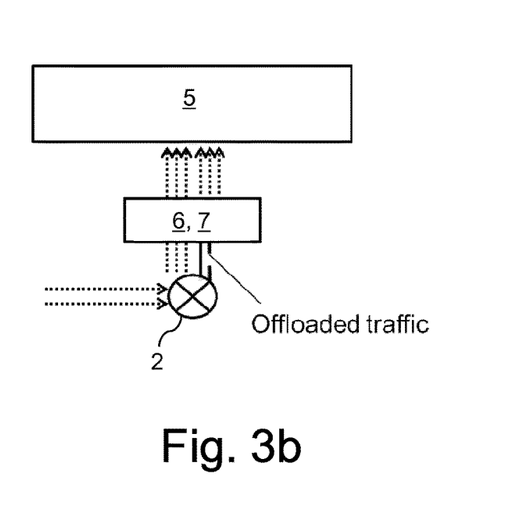

Other embodiments of the present invention are related to methods to delegate In-Events, Out-Events or Mod-Events to dedicated devices, which are specifically deployed in the network to allow switches to offload certain traffic to them. A respective example is schematically illustrated in FIG. 3b, where a switch 2 has a physical connection (indicated by the solid line) to a delegated entity 6 that is implemented in form of a dedicated offloading device 7.

Figure 8:
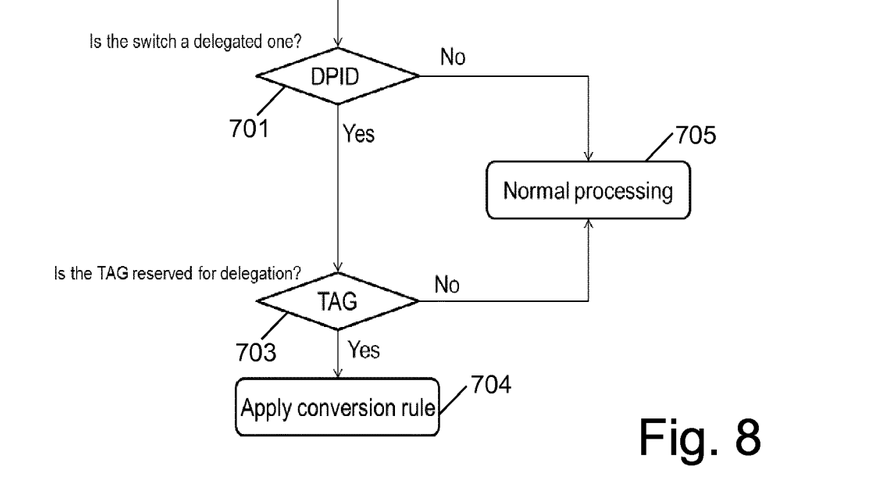
FIG. 8 is a flow diagram illustrating the decision process in an in-event filter in case of an indirect connection between an SDN switch and a delegated entity in accordance with an embodiment of the present invention.
Figure 9:
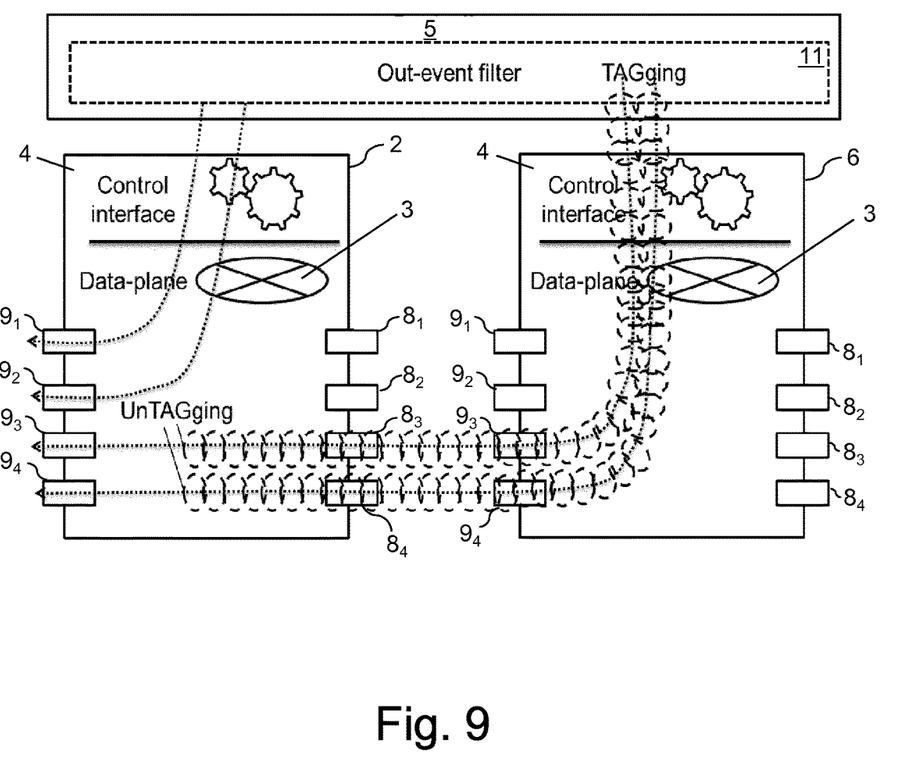
FIG. 9 is a schematic view illustrating a process of out-event offloading to another switch acting as delegated entity in accordance with an embodiment of the present invention.
Figure 10:
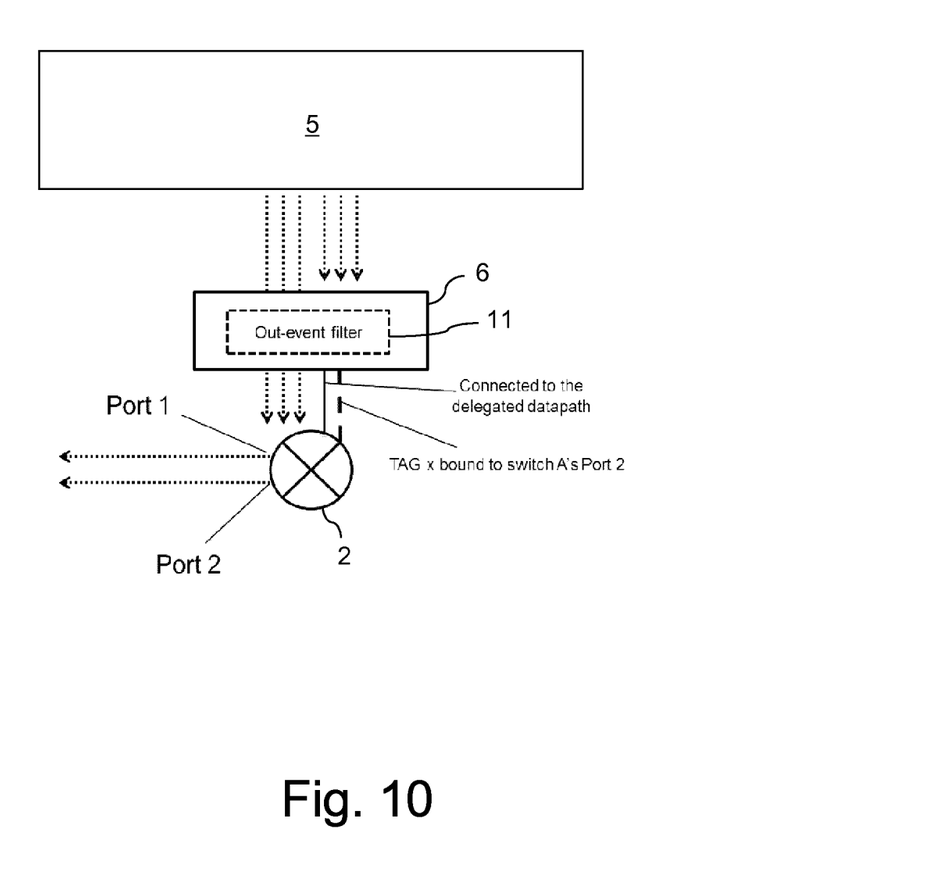
FIG. 10 is a schematic view illustrating a process of out-event offloading to a dedicated delegated entity in accordance with an embodiment of the present invention.
Figure 11:
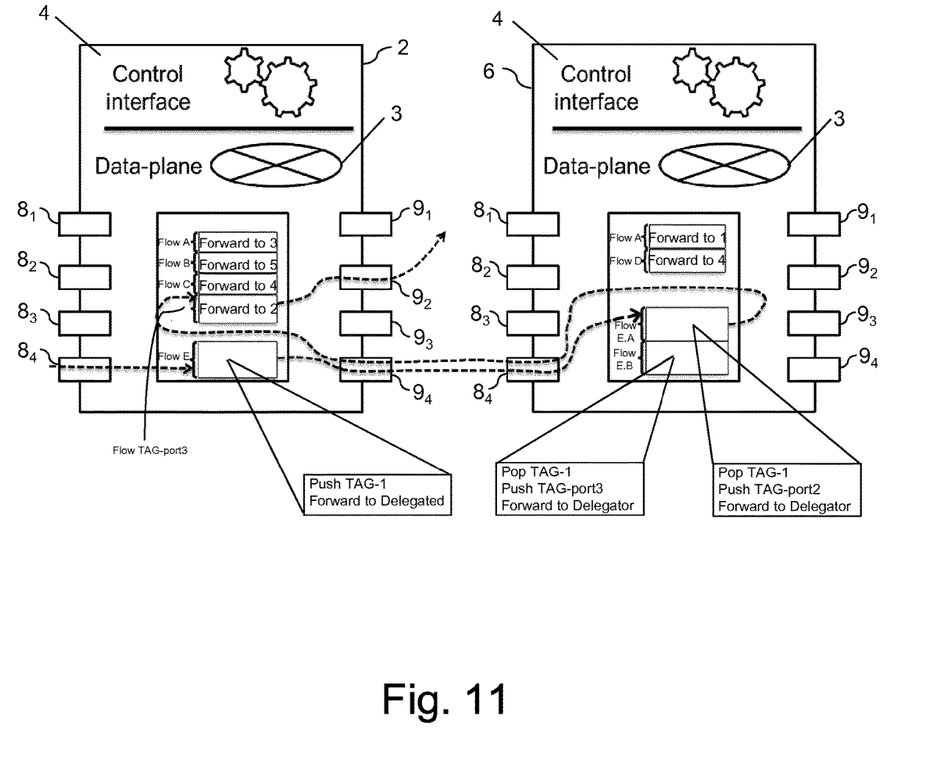
FIG. 11 is a schematic view illustrating a process of mod-event offloading to another switch acting as delegated entity in accordance with an embodiment of the present invention.
Figure 12:
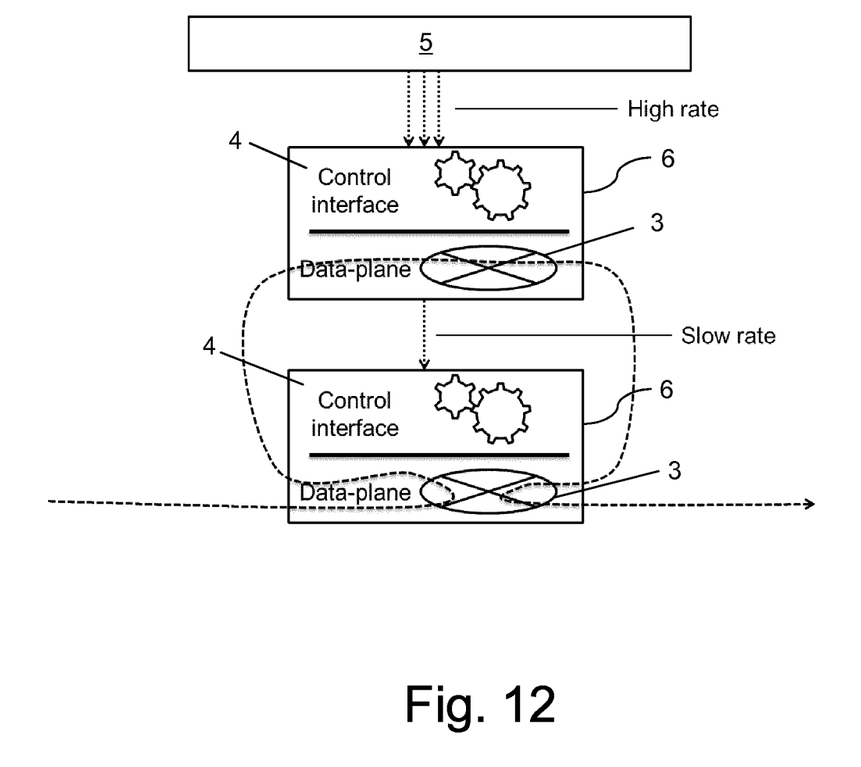
FIG. 12 is a schematic view illustrating a process of mod-event handling by a control interface proxy in accordance with an embodiment of the present invention.

According to the invention, various embodiments of the invention related to event distribution are described in some more detail. While the embodiments of FIGS. 4-8 are related to In-Event distribution, FIGS. 9 and 10 are related to Out-Event distribution and FIGS. 11 and 12 are related to Mod-Event distribution.

Figure 4:
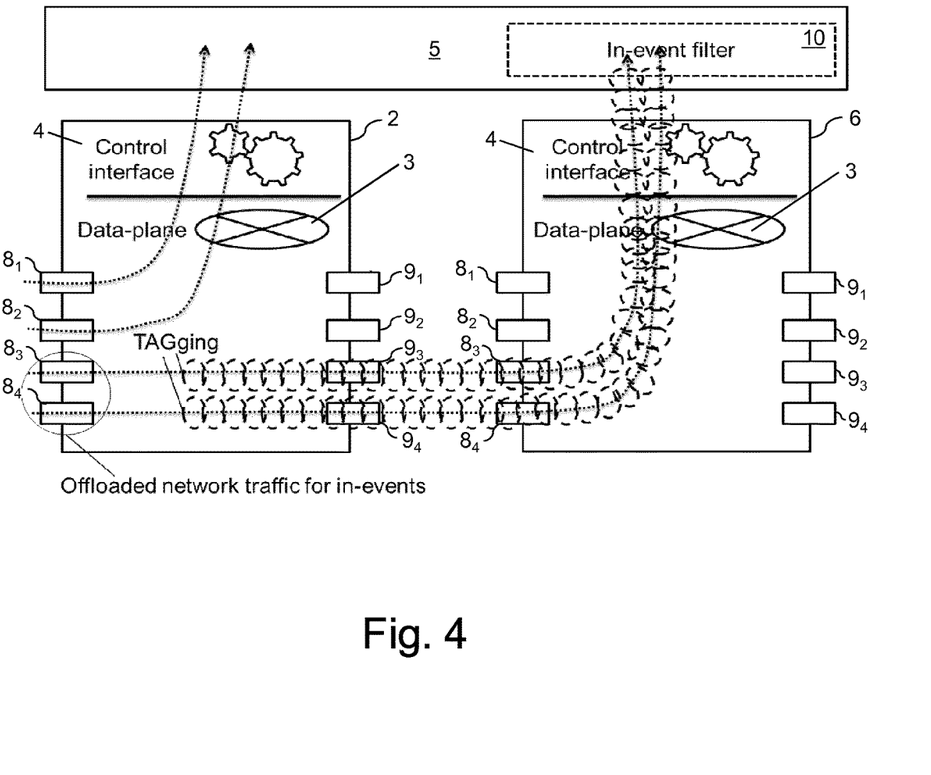
FIG. 4 is a schematic view illustrating a process of in-event offloading to another switch acting as delegated entity in accordance with an embodiment of the present invention.

According to an embodiment of the invention in FIG. 4, like components are denoted by the same reference numerals as employed with respect to the previously described embodiments in connection with FIGS. 1-3. Using the in-event distribution approach described hereinafter, a subset of network flows arriving at the delegator 2, which is defined by specific rules implemented at the delegator's 2 data plane 3, is forwarded to a delegated entity 6. According to the illustrated embodiment, network flows arriving at input ports $8_1$ and $8_2$ of the delegator 2 are processed conventionally. It is assumed that there is no matching rule in the delegator's 2 forwarding table, hence, conventional processing in this case means that the network flows are notified to the controller entity 5 via the delegator's 2 control interface 4. On the other hand, network flows arriving at input ports $8_3$ and $8_4$ of the delegator 2, which normally would also generate one or more in-events at the delegator 2, are instead forwarded to a delegated device 6.

With respect to the forwarded network flows, the delegated entity 6 generates in-events on behalf of the delegator 2. These in-events are intercepted by an in-event filter 10, which is a logical entity located at the controller entity 5. It is to be understood that the filter 10 could also be located at the delegated entity 6, as will be explained in detail below. The task of the in-event filter 10 is to transform in-events in such a way that they are undistinguishable (from the perspective of the controller entity 5) from in-events generated instead at the delegator 2.

In the in-event distribution approach the delegator switch 2 is coupled with a delegated device 6. According to an embodiment, the coupling process for in-event distribution may include the following steps:

1. Installation of appropriate rules into the delegator 2 forwarding table:

The coupling process actually forwards a subset of the network traffic received at the delegator 2, using the installed rules, in order to enable the delegated entity 6 to perform the required control interface processing on such traffic.

2. Installation of an in-event filter 10 (either into the controller entity 5 or into the delegated entity 6):

An in-event contains at least the following pieces of information:

a. The device ID of the switch that generated the event;
b. The ID of the switch's port from which the packet related to the event was received.

Usually such information is inserted into the in-event by the switch's 2 control interface 4. However, when the network traffic is forwarded to the delegated entity 6, such information is missing since the traffic is being processed at the delegator's 2 data-plane 3 only. Therefore, the in-event filter 10 is configured to insert the correct information into the in-event generated at the delegated entity 6, in the same way as it was generated at the delegator 2, i.e., the controller entity 5 is unable to distinguish between in-events generated at the delegator 2 or at the delegated entity 6.

To provide the delegated entity 6 with the required information (i.e., who is the delegator device 2 and the delegator's 2 output port 9 from where the network traffic is received) the rules installed at the delegator 2 write an appropriate TAG into the network packets before forwarding them to the delegated entity 6. The in-event filter 10 uses the TAG to derivate the delegator 2 and port information, referring to a TAG mapping table properly built during the coupling process.

Figure 5:
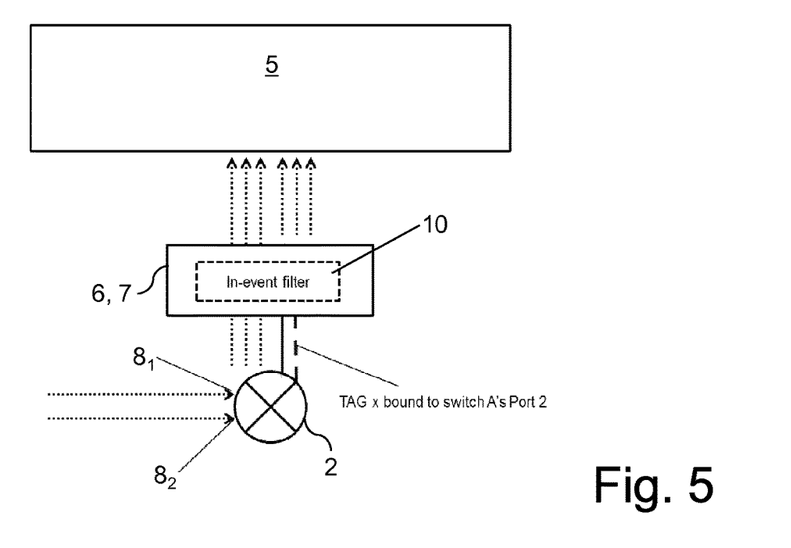
FIG. 5 is a schematic view illustrating a process of in-event offloading to a dedicated delegated entity in accordance with an embodiment of the present invention.

FIG. 5 illustrates another example of the in-event distribution approach. Again, the same reference numerals denote like or same components. In contrast to the embodiment of FIG. 4, where the delegated entity 6 was implemented in form of another SDN switch, in FIG. 5 the delegated entity 6 is realized in form of a dedicated device 7, which is specifically deployed within the network for the purpose of providing offloading functionality to delegator 2. Further, in contrast to the embodiment of FIG. 4 the in-event filter 9 is not located at the controller entity 5, but directly at the dedicated offloading device 7.

While according to FIG. 5 network traffic received via the delegator's 2 input port $8_1$ is being processed conventionally, traffic received via input port $8_2$ is offloaded to the delegated entity 6. To this end, delegator 2 writes an appropriate TAG (denoted 'x') that is bound to the delegator's input port $8_2$ into the network packets before forwarding them to the delegated entity 6. This information enables the in-event filter 9 to transform the in-events as if they were generated by the delegator 2 itself.

Figure 6:
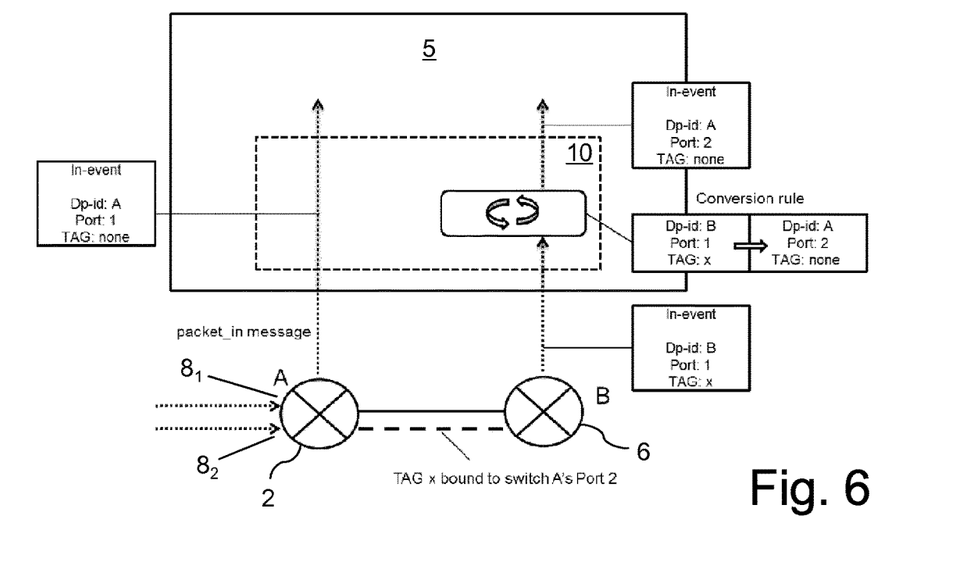
FIG. 6 is a schematic view illustrating the process of in-event transformation performed by an in-event filter in accordance with an embodiment of the present invention.

The tagging mechanism is illustrated in more detail in connection with FIG. 6. Packets received at input port $8_1$ of the delegator 2 are processed conventionally, i.e. in-events containing the delegator's ID ('Dp-id: A' in the illustrated example) and the ID of the switch's port from which the packet related to the event was received ('Port: 1' in the illustrated example). There is no tagging in the conventional case.

In contrast, packets received at input port $8_2$ of the delegator 2 are offloaded to another switch, which thus functions as delegated entity 6. The delegator 2 writes an appropriate Tag (denoted 'x') that is bound to the delegator's input port $8_2$ into the network packets before forwarding them to delegated entity 6. Upon reception of a packet via its input port $8_1$, delegated entity 6 generates a respective in-event. Since this in-event is generated by the delegated entity 6 (instead of the delegator 2), it contains as information elements the ID of the delegated entity 6 ('Dp-id: B') and the ID of the respective input port ('Port 1'), as well as Tag 'x'. Before the in-event is sent to the controller entity 5, it passes in-event filter 10. By applying appropriate conversion rules that have been generated during the coupling process, in-event filter 10 transforms the in-event into an in-event that looks as if it was generated by the delegator 2 itself. Specifically, the device ID is changed from 'B' to 'A', the input port is changed from 'Port 1' to 'Port 2', and Tag 'x' is removed. Consequently, from the perspective of the controller entity 5 the in-event exactly looks like an in-event received from switch A (i.e. from delegator 2) directly. The entire offloading and transformation process is therefore completely transparent from the perspective of controller entity 5.

Figure 7:
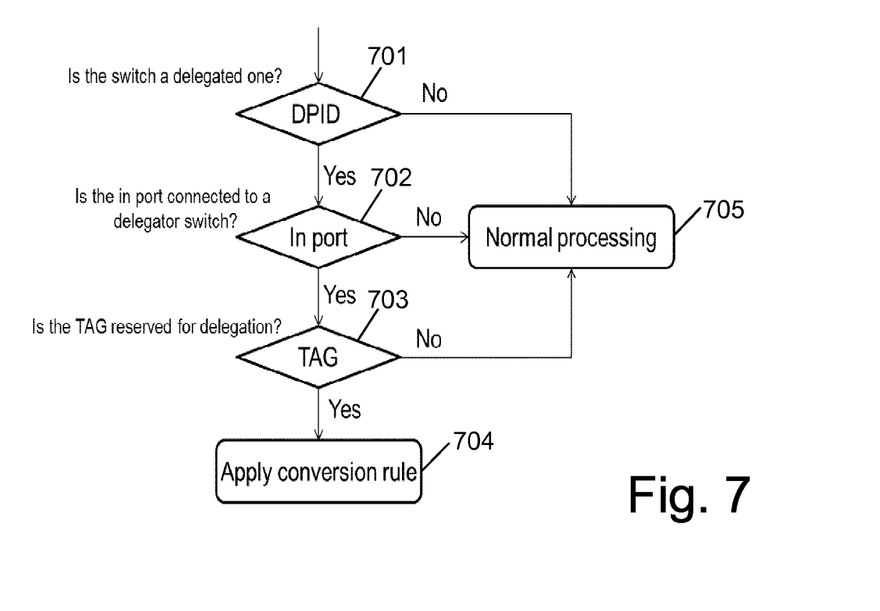
FIG. 7 is a flow diagram illustrating the decision process in an in-event filter in case of a direct connection between an SDN switch and a delegated entity in accordance with an embodiment of the present invention.

FIG. 7 is a flow diagram exemplary illustrating a decision process taken by in-event filter 10 in case of a direct connection between a delegator and delegated entity. In step 701 the in-event filter 10 starts the decision process by checking whether the switch the in-event was received from is a delegated one. This decision can be taken based on the device ID contained inside the in-event. Next, as illustrated at 702, the in-event filter 10 checks whether the input port of the switch the in-event was received from is connected to a delegator switch. In this regard, the input port directly connected to the delegator switch can be used as a mean to understand if the in-event was generated by the delegator switch. Finally, as illustrated at 702, the in-event filter 10 checks whether the Tag contained inside the in-event is reserved for a delegation. In case each of the tests 701, 702, 703 is positive, the in-event filter 10, in step 704, applies the conversion rules according to the Tag mapping table built during the coupling process, in order to transform the in-event. Otherwise, as illustrated at 705, normal processing of the in-event is applied.

In the embodiments of FIGS. 4-7, the delegator's 2 data-path is connected directly to the delegated entity 6. However, as will be appreciated by those skilled in the art it is also possible to establish the connection through a network path between the delegator 2 and the delegated entity 6. In this case, a network tunnel between the delegator 2 and the delegated entity is setup, and all the devices along the path between the delegator 2 and the delegated entity 6 have to be instructed to forward to the delegated entity 6 the packets marked with the TAG. An exemplary decision process in the in-event filter 10 in case of an indirect connection between delegator and delegated devices is illustrated in FIG. 8.

According to embodiments of the invention in FIGS. 9 and 10, in which again same reference numerals denote like or same components, embodiments of the out-event distribution approach will be described in some more detail. The difference between the two embodiments consists in the fact that the delegated entity 6 of FIG. 9 is another switch deployed in the network, whereas the delegated entity 6 of FIG. 10 is a dedicated device specifically deployed in the network for the purpose of providing offloading functionality to delegator 2.

Basically, according to the out-event distribution approach, a controller entity 5 that would send one or more out-events directly to the delegator 2, instead sends them to an out-event filter 11. In the embodiment of FIG. 9 out-event filter 11 is a logical entity implemented at the controller entity 5. The out-event filter 11 decides if to send out-events directly to the delegator 2, or if to send them to a delegated device 6. In this last case, the out-event is transformed in a delegated out-event, which is handled at the delegated device 6 and sent to the delegator 2 passing though the data-path, where appropriate rules in the delegator's 2 forwarding table transform the delegated out-event so that the final effect, e.g., packets sent through the delegator's 2 ports, is the same as if the original out-event was directly sent to the delegator 2.

In the out-event distribution approach the delegator switch 2 is coupled with a delegated entity 6, wherein the delegator's 2 data-path is connected directly to the delegated entity 6, as best shown in FIG. 1. According to the illustrated embodiment, in which the delegated entity 6 is another switch, the coupling process for out-event distribution may include the following steps:

1. Installation of appropriate rules into the delegator's 2 forwarding table:

The installed rules allow for delegated devices to decide through which data-plane output port 9 of the delegator switch 2 a packet should be forwarded. In particular, each output port 9 of the delegator is associated with a given TAG. When a packet is received with such a TAG, the TAG is striped out and the packet forwarded to the correspondent output port 9.

2. Installation of an out-event filter 11 (either into the controller entity 5 or into the delegated entity 6):

The out-event filter 11 is configured to decide if an out-event generated by a controller entity 5 has to be sent directly to the delegator 2, or if it has to be transformed into a delegated out-event, that is sent instead to a delegated entity 6. Such a decision can be taken according to a proper decision logic, based, e.g., on a round-robin scheduling or on load information about the delegator's control interface 4.

In case the out-event is sent to a delegated entity 6, the out-event may be transformed in the following way:

a. The contained network packet is tagged by the out-event filter 11 with the TAG corresponding to the requested output port 9 of the out-event.

b. The output port 9 of the out-event is substituted with the output port 9 of the delegated entity 6 that connects the delegated entity 6 to the delegator 2.

If there is no direct connection, a network tunnel is setup of between the delegator 2 and the delegated entity 6. In this case the output port substitution mentioned above is performed by substituting the output port 9 of the out-event with the output port 9 connected to the first link of the network path that connects the delegated entity 6 with the delegator 2. Further, all the devices along the path between the delegator 2 and the delegated entity 6 are instructed to forward the packets marked with the TAG to the delegator 2.

FIG. 11 schematically illustrates an embodiment of a mod-event distribution approach. By using the mod-event distribution as described hereinafter, a controller entity 5 is enabled to accelerate the speed of modifications it is able to perform on a switch internal state, in particular to a switch forwarding table.

Basically, according to the mod-event distribution approach as shown in FIG. 11, a part of the delegator 2 switch forwarding table is delegated of to a delegated entity 6. The delegator switch 2 is coupled with a delegated entity 6, wherein the delegator's 2 data-path is connected directly to the delegated entity 6. According to the illustrated embodiment, in which the delegated entity 6 is another switch, the coupling process for mod-event distribution may include the following steps:

1. Installation of appropriate rules into the delegator's 2 forwarding table:

The installed rules forward a set of network flows to the delegated entity 6. The forwarded flows are the ones for which the delegated entity 6 is managing the forwarding table. At the same time the rules allow for other devices (i.e., the delegated one) to decide through which data-plane output port 9 of the delegator switch 2 a packet should be forwarded, like in the out-event distribution case.

2. Installation of a mod-event filter (either into the controller entity or into the delegated entity 6):

The mod-event filter is configured to decide if a mod-event generated by a controller entity has to be sent directly to the delegator 2 or if it has to be transformed in a delegated mod-event that is sent instead to a delegated entity 6. Like in the out-event distribution case, such a decision can be taken according to a proper decision logic, based, e.g., on a round-robin scheduling or switch control interface load information.

In case the mod-event is sent to a delegated entity 6, the mod-event may be transformed in the following way:

a. The rules contained in the mod-event are extended to match the flows that have the packets marked with the TAG inserted at the delegator 2. For example, if a rule is applied to the flows identified by the destination IP address 1.1.1.1, the rule is modified to be applied to the flows identified by the destination IP address 1.1.1.1 AND tagged with the TAG specified during the coupling process;

b. An action to tag with the TAG corresponding to the requested output port of the out-event;

c. Any port, contained into a forwarding action of the rules contained in the mod-event, is substituted with the port that connects the delegated entity 6 to the delegator 2 (or with the port connected to the first link of the network path that connects the delegated entity 6 with the delegator 2). At the same time a tagging action is added to the rule, to tag the handled packets with the TAG corresponding to delegator's port as contained in the original forwarding action of the rule;

3. The setup of a network tunnel between the delegator 2 and the delegated entity 6, in case they are not directly connected.

For instance, the embodiment illustrated in FIG. 11 is related to a mod-event that addresses a network flow (denoted Flow E in FIG. 11) the delegator 2 receives via its input port $8_4$. By means of the mod-event the controller entity (not shown in FIG. 11) wishes to instruct the delegator 2 to split Flow E and to forward a specific part of Flow E, denoted Flow E.A, via output port $9_3$, and to forward the other part of flow E, denoted Flow E.B, via output port $9_2$. However, in order to disburden the delegator's 2 control interface 4, the controller entity (not shown in FIG. 11) sends the mod-event to the delegated entity 6, instead of sending it directly to the delegator 2.

With respect to Flow E, the forwarding rules at the delegator 2 are amended in such a way that the respective packets are marked with a TAG (denoted TAG-1 in FIG. 11) and forwarded to the delegated entity 6. In the forwarding table of the delegated entity 6 appropriate rules have been implemented in accordance with the specifications contained in the mod-event. In the illustrated embodiment, to entries have been introduced in the forwarding table of the delegated entity 6: One rule relates to Flow E.A and contains the instruction to delete (i.e. to pop) TAG-1, to introduce (i.e. to push) a new TAG (denoted TAG-port3 in FIG. 11) and to forward the packets to the delegator 2. The other rule relates to Flow E.B and contains the instruction to delete (i.e. to pop) TAG-1, to introduce (i.e. to push) a new TAG (denoted TAG-port2 in FIG. 11) and to forward the packets to the delegator 2. For the sake of clarity, in FIG. 11 the forwarding process is only illustrated for Flow E.A. As can be seen, Flow E.A is directed back to the delegator 2, where it is directed by means of an appropriate rule built during the coupling process to output port $9_3$ in accordance with the specifications contained in the mod-event.

Since the mod-event distribution is introducing some inefficiency in the handling of the data-path, the distribution can actually take place during delegator's 2 control interface 4 overload times, i.e. only temporarily, and, as soon the control interface 4 becomes again available, the mod-event are effectively installed at the delegator 2, relieving the delegated entity 6 from the handling of such flows, hence, using the data-path in an efficient way. While the mod-events are applied at the delegated, their effect is anyway already in place.

Such an approach can be used to build a high-performance control interface proxy. The proxy, working as delegated, handles all the mod-event messages, and decides, according to a given policy, which mod-events should be forwarded first to the delegator, and which ones can be applied locally in the delegated entity while the delegator's control interface is overloaded, to be forwarded to the delegator in a second time.

The decision about the mod-events that have to be forwarded first to the delegator can be taken according to several parameters, including, e.g., the forwarding capability of the delegated entity, the network flows properties, and so on. A preferred embodiment of a control interface proxy is illustrated in FIG. 12, where the mod-events are handled first at the high-rate delegated entity's control interface, where they are applied locally. The mod-events are then issued at the slower delegated entity's control interface, for installation in the delegated data-path.

Generally, the present invention provides a framework to steer network flows through an intermediate physical or virtual device, denoted delegated entity, in a transparent manner from a controller perspective. Even though the main envisioned applications of embodiments of the present invention are related to a switch's control interface offloading, it is possible to exploit the invention to provide other applications, for instance by using the offloading framework to reroute network flows for the purpose of implementing a network service, which is not available in a given SDN switch. According to one such application it is possible to use the present invention for data-plane capabilities enhancement. For instance, in case a switch is missing a required capability in the data-plane, e.g., the ability to perform a flied rewriting, the techniques described in detail above can be used to steer the traffic towards a delegated entity, which in such case would not function as an "offloading box", as described in connection with the previous embodiments, but as a kind of "enhancing box". This "enhancing box" may be a physical or virtual device that provides the required capability, e.g. another switch or a dedicated entity.

Another possible application is related to flow-table enhancement. For instance, in case a switch (delegator) is unable to host all the required flow table entries, the flow table can be extended by using a delegated entity in accordance with the techniques described in detail above. Again, the delegated entity would not function as an "offloading box", but as a kind of "enhancing box" that may be implemented as a physical or virtual device, e.g. another switch or a dedicated box with enough flow table space. The "enhancing box" can implement a proper algorithm to decide which flows is better to keep into the delegator's flow table and which ones are worth to be installed in the delegated entity's flow table.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A packet data network, comprising
a flow-based programmable network device including a data plane having a plurality of input and output ports, a control interface and forwarding rules that map packets received on one of the input ports to one of the output ports based on a packet matching a rule in the forwarding rules;
at least one delegated entity having a second control interface and connected to the flow-based programmable network device via the data plane; and
a controller entity configured to program the forwarding rules in the flow-based programmable network device via the control interface and the at least one delegated entity via the second control interface,
wherein the flow-based programmable network device provides required information to the delegated entity by writing tag information, including the output port and the identity of the flow-based programmable network device to network packets in the network traffic, and the at least one delegated entity is a network device configured to perform, using the forwarding rules, control interface processing on network traffic on behalf of the flow-based programmable network device by using the tag information to insert the output port and the identity of the flow-based programmable network device, such that the network traffic, from the perspective of the controller entity, is indistinguishable from network traffic that is processed by the flow-based programmable network device directly.

2. The network according to claim 1, further comprising a filter component configured to decide which network traffic to offload from the flow-based programmable network device.

3. The network according to claim 2, wherein the filter component is a logical entity located either at the controller entity or at the at least one delegated entity.

4. The network according to claim 2, wherein the filter component is configured to transmit, to the flow-based programmable network device, offloading decisions that instruct the flow-based programmable network device to direct certain network flows to the at least one delegated entity.

5. The network according to claim 2, wherein the filter component is configured to generate static offloading decisions based on known or expected traffic patterns or based on known performance metrics of the flow-based programmable network device, or both.

6. The network according to claim 2, wherein the filter component is configured to generate dynamic offloading decisions by applying offloading to the flow-based programmable network device based on an amount of control traffic exchanged with the flow-based programmable network device exceeding a predefined threshold.

7. The network according to claim 1, wherein the network is configured to offload the network traffic from the flow-based programmable network device to the at least one delegated entity by an installation of appropriate rules into a forwarding table of the flow-based programmable network device.

8. The network according to claim 1, further comprising a tagging mechanism configured to tag network packets that belong to the network traffic offloaded from the flow-based programmable network device.

9. The network according to claim 1, wherein the network is configured to offload the network traffic based on at least one of In-events, Out-events, or Mod-Events.

10. The network according to claim 9, further comprising a filter component, wherein the filter component is configured to generate conversion rules for transforming messages related to offloaded events in such a way that the messages, from the perspective of the controller entity, are indistinguishable from respective messages that are generated by or directed to the flow-based programmable network device directly.

11. The network according to claim 1, wherein the flow-based programmable network device is connected to the at least one delegated entity directly or through a network path.

12. The network according to claim 1, wherein the flow-based programmable network device and the at least one delegated entity are not directly connected, and wherein a network tunnel is established between the flow-based programmable network device and the at least one delegated entity.

13. The network according to claim 1, wherein the flow-based programmable network device is a switch or a router.

14. The network according to claim 1, wherein the flow-based programmable network device is configured to use OpenFlow protocol.

15. The network according to claim 1, wherein the at least one delegated entity is a software-defined networking (SDN) switch deployed in the network or a dedicated entity.

16. The network according to claim 1, wherein the at least one delegated entity is a physical or virtual device.

17. A method for operating a packet data network, comprising a flow-based programmable network device and a controller entity, the flow-based programmable network device including a data plane having a plurality of input and output ports, a control interface and forwarding rules that map packets received on one of the input ports to one of the output ports based on a packet matching a rule in the forwarding rules; the controller entity being configured to program the flow-based programmable network device via the control interface, the method comprising:

establishing a connection of the flow-based programmable network device via the data plane to at least one delegated entity which is a network device, the at least one delegated entity having a second control interface;

programming, by the controller entity, the forwarding rules in the at least one delegated entity;

writing, by the flow-based programmable network device, tag information, including the output port and the identity of the flow-based programmable network device, to network packets in network traffic; and processing, by the at least one delegated entity, using the forwarding rules the network traffic on behalf of the flow-based programmable network device by using the tag information to insert the output port and the identity of the flow-based programmable network device, such that the network traffic, from the perspective of the controller entity, is indistinguishable from network traffic that is processed by the flow-based programmable network device directly.

18. A flow-based programmable network device, comprising:

a data plane having a plurality of input and output ports, and forwarding rules that map packets received on one of the input ports to one of the output ports based on a packet matching a rule in the forwarding rules; and a control interface configured to receive configuration settings from a controller entity for programming the flow-based programmable network device, wherein the flow-based programmable network device is configured, upon receiving offloading decisions from the controller entity, to offload network traffic from the control interface by directing and receiving network traffic through the data plane to and from at least one delegated entity which is a network device configured to perform, using the forwarding rules, control interface processing on network traffic on behalf of the flow-based programmable network device such that the network traffic, from the perspective of the controller entity, is indistinguishable from network traffic that is processed by the flow-based programmable network device directly and the flow-based programmable network device provides required information to the delegated entity by writing tag information, including the output port and the identity of the flow-based programmable network device, to network packets in the network traffic.

19. The flow-based programmable network device according to claim 18, wherein the flow-based programmable network device is a switch or a router and is configured to use OpenFlow protocol.

* * * * *